United States Patent
Tan et al.

(10) Patent No.: US 11,981,098 B2
(45) Date of Patent: May 14, 2024

(54) OPTICAL LENS AND METHOD OF COATING AN EDGE SURFACE OF AN OPTICAL LENS

(71) Applicant: Essilor International, Charenton-le-Pont (FR)

(72) Inventors: Mabeline Tan, Singapore (SG); Hui Yu, Singapore (SG); Ker Chin Ang, Singapore (SG); David Herfort, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 919 days.

(21) Appl. No.: 16/978,939

(22) PCT Filed: Mar. 14, 2019

(86) PCT No.: PCT/EP2019/056507
§ 371 (c)(1),
(2) Date: Sep. 8, 2020

(87) PCT Pub. No.: WO2019/175360
PCT Pub. Date: Sep. 19, 2019

(65) Prior Publication Data
US 2021/0046718 A1 Feb. 18, 2021

(30) Foreign Application Priority Data

Mar. 16, 2018 (EP) ..................... 18305297

(51) Int. Cl.
*B29D 11/00* (2006.01)
*G02B 1/11* (2015.01)
*G02C 7/02* (2006.01)

(52) U.S. Cl.
CPC .......... *B29D 11/00865* (2013.01); *G02B 1/11* (2013.01); *G02C 7/02* (2013.01)

(58) Field of Classification Search
CPC ........ B29D 11/00865; B29D 11/00009; G02B 1/11; G02C 7/02; G02C 1/10
See application file for complete search history.

(56) References Cited

U.S. PATENT DOCUMENTS

| 4,076,863 A | 2/1978 | Onoki et al. |
| 5,220,358 A | 6/1993 | Brown et al. |

(Continued)

FOREIGN PATENT DOCUMENTS

| CN | 1447745 A | 10/2003 |
| CN | 1871539 A | 11/2006 |
| CN | 106574987 A | 4/2017 |

OTHER PUBLICATIONS

International Search Report for PCT/EP2019/056507 dated Jun. 13, 2019, 5 pages.

(Continued)

*Primary Examiner* — James C. Jones
(74) *Attorney, Agent, or Firm* — Nixon & Vanderhye

(57) ABSTRACT

A method of coating an edge surface of an optical lens is provided. The method includes providing an optical lens comprising a first optical surface and an opposing second optical surface, wherein the first and the second optical surfaces are connected by an edge surface, disposing at least one temporary protective material on at least a portion of a perimeter portion of one or both of the first and the second optical surfaces abutting the edge surface, disposing at least one coating material on the edge surface of the optical lens to obtain at least one edge coating, and removing any excess coating material disposed on the at least one temporary protective material. An optical lens having at least one temporary protective material disposed on only at least a portion of a perimeter portion of one or both of the first and the second optical surfaces abutting the edge surface is also provided.

13 Claims, 6 Drawing Sheets

(56) References Cited

U.S. PATENT DOCUMENTS

| | | | |
|---|---|---|---|
| 2004/0096576 A1* | 5/2004 | Chen | B29D 11/00865 |
| | | | 427/508 |
| 2009/0141236 A1* | 6/2009 | Chen | G02B 1/11 |
| | | | 427/164 |
| 2009/0207374 A1 | 8/2009 | Ho et al. | |
| 2017/0282470 A1 | 10/2017 | Shan et al. | |

OTHER PUBLICATIONS

Written Opinion of the ISA for PCT/EP2019/056507 dated Jun. 13, 2019, 6 pages.
Office Action issued in Chinese Patent Application No. 201980018313.0 dated Nov. 1, 2021.

* cited by examiner

_(12) United States Patent_ US 11,981,098 B2

OPTICAL LENS AND METHOD OF COATING AN EDGE SURFACE OF AN OPTICAL LENS

This application is the U.S. national phase of International Application No. PCT/EP2019/056507 filed Mar. 14, 2019 which designated the U.S. and claims priority to EP Patent Application No. 18305297.6 filed Mar. 16, 2018, the entire contents of each of which are hereby incorporated by reference.

TECHNICAL FIELD

This disclosure relates generally to optical lenses, and methods of coating an edge surface of an optical lens.

BACKGROUND

A coating material may be introduced on the edge of an optical lens as an edge coating for various reasons. For example, an opaque coating may be deposited on the edge of an optical lens to reduce visibility of "myopia rings" and "white rings" for aesthetic purposes. Examples of a "myopia ring" and a "white ring" are shown in FIG. 1A and FIG. 1B as 110 and 112, respectively. To this end, an operator may apply the coating material on the edge of an optical lens using a marker pen or a brush, or by spray coating. Ideally, the coating material is applied onto the edge surface of the optical lens only, without any of the coating material being coated on the optical surfaces of the optical lens.

For illustration purposes, FIG. 2A is a schematic diagram showing an edge coating 202 disposed on an edge surface of an optical lens 200. The edge surface of the optical lens 200 is defined by the surface connecting the first optical surface 220 and the second optical surface 222. The edge surface of the optical lens 200 comprises a lens bevel 226 and a safety bevel 224. As depicted in the figure, there is no overflow on the first optical surface 220 and the second optical surface 222 of the optical lens 200.

Notwithstanding the above, the operator often finds himself or herself in a situation whereby he or she accidentally introduces some excess coating, otherwise termed herein as overflow, on the optical surfaces. This is depicted in FIG. 2B, which is a schematic diagram showing an edge coating 202 disposed on an edge surface of an optical lens 200. As shown in the figure, there is overflow in the form of excess coating material 204, 206 disposed respectively on the first optical surface 220 and the second optical surface 222 of the optical lens 200. These overflows have to be removed completely so as not to compromise aesthetics of the optical lens. In embodiments wherein an optical lens edge comprises multiple facets, for example, it is very difficult to ensure complete coating coverage on each and every facet, while not introducing overflows on the optical surfaces.

Current methods to remove the overflows are laborious, and quality of the final product varies greatly depending on the skills and craftsmanship of the operator processing them. For example, an operator who attempts to remove the overflow with a solvent, such as acetone or isopropyl alcohol (IPA), often removes a part of the edge coating inadvertently. Therefore, another attempt has to be made to touch up the edge coating. The laborious cycle(s) of overflow removal and touching up of the edge coating may continue until conditions of good cosmetics of the optical lens are met. Based on the above discussion, quality of the final product may rely solely on the dexterity of the operator who is carrying out the overflow removal. This is even more significant for cases where touching up of the edge coating is not possible.

Moreover, in embodiments wherein a safety bevel is comprised in the edge surface of an optical lens, a defined breakage between the overflow and the intended edge coating is not achievable using state of the art removal processes. This translates into incomplete removal of overflow from the optical surfaces and is depicted in FIG. 3. As shown in the figure, remnants of coating 304 not removed by the removal process remain as fragments on the optical lens 300, causing bad aesthetics when viewed from the first optical surface or the second optical surface of the optical lens.

Other methods to tackle problems with overflow removal include use of ultraviolet (UV) curable coatings and remove the overflow from optical surfaces using suitable sticky tapes. This method has several limitations. For example, specific UV-curable coatings have to be developed such that difference in adhesion of the UV-curable coating with the edge surface and the optical surfaces are large enough, so that the UV-curable coating may be removed from the optical surfaces easily. This in turn limits the choice of suitable lens edge coating materials. In cases of UV-curable coatings which are opaque, UV light is not able to penetrate the opaque coating beyond a certain thickness. Consequently, mechanical strength of the UV-curable coating may be compromised due to insufficient curing of the coating beneath the surface.

In light of the above, there remains a need for improved methods which are able to provide a consistent and complete coating coverage on the edge surface of an optical lens, while ensuring absence of the coating material on the optical surfaces, thereby addressing or at least alleviating one or more of the above-mentioned problems.

SUMMARY

In a first aspect, a method of coating an edge surface of an optical lens is provided. The method comprises
 a) providing an optical lens comprising a first optical surface and an opposing second optical surface, wherein the first optical surface and the second optical surface are connected by an edge surface;
 b) disposing at least one temporary protective material on at least a portion of a perimeter portion of one or both of the first optical surface and the second optical surface abutting the edge surface;
 c) disposing at least one coating material on the edge surface of the optical lens to obtain at least one edge coating; and
 d) removing any excess coating material disposed on the at least one temporary protective material from the one or both of the first optical surface and the second optical surface.

The at least one temporary protective material is selected from the group consisting of a metallic fluoride, a metallic oxide, and a combination. Other advantageous aspects of the method according to the invention are described in claims 2 to 13.

In a second aspect, an optical lens is provided. The optical lens comprises a first optical surface and an opposing second optical surface, wherein the first optical surface and the second optical surface are connected by an edge surface, the optical lens further comprising at least one temporary protective material disposed on only at least a portion of a perimeter portion of one or both of the first optical surface and the second optical surface abutting the edge surface.

Other advantageous aspects of the lens according to the invention are described in claim 15.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1A:
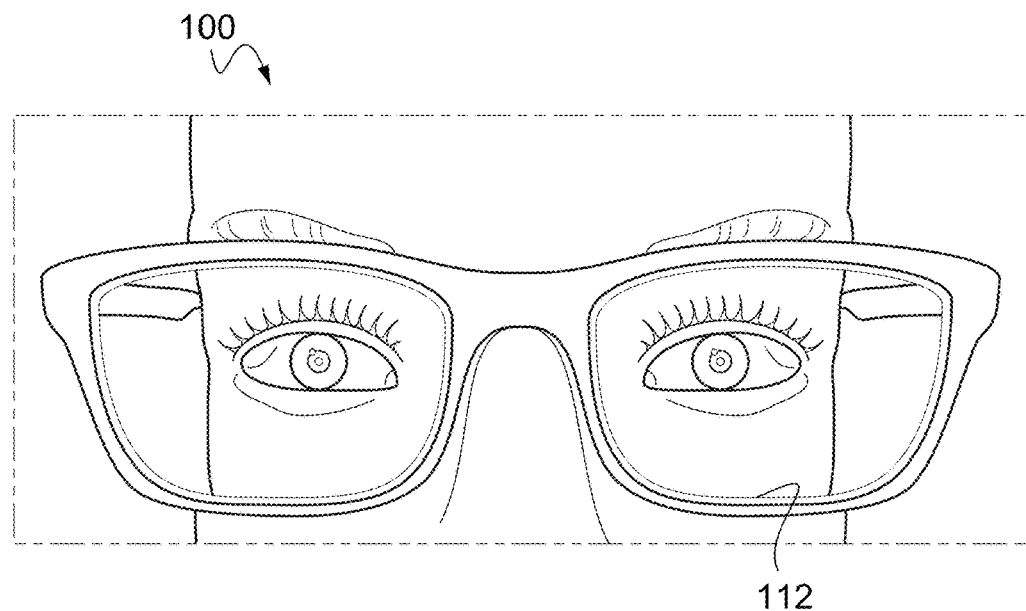
FIG. 1A is a photograph showing front view of a user wearing an eyeglass 100. A white ring 112 is shown.
Figure 1B:
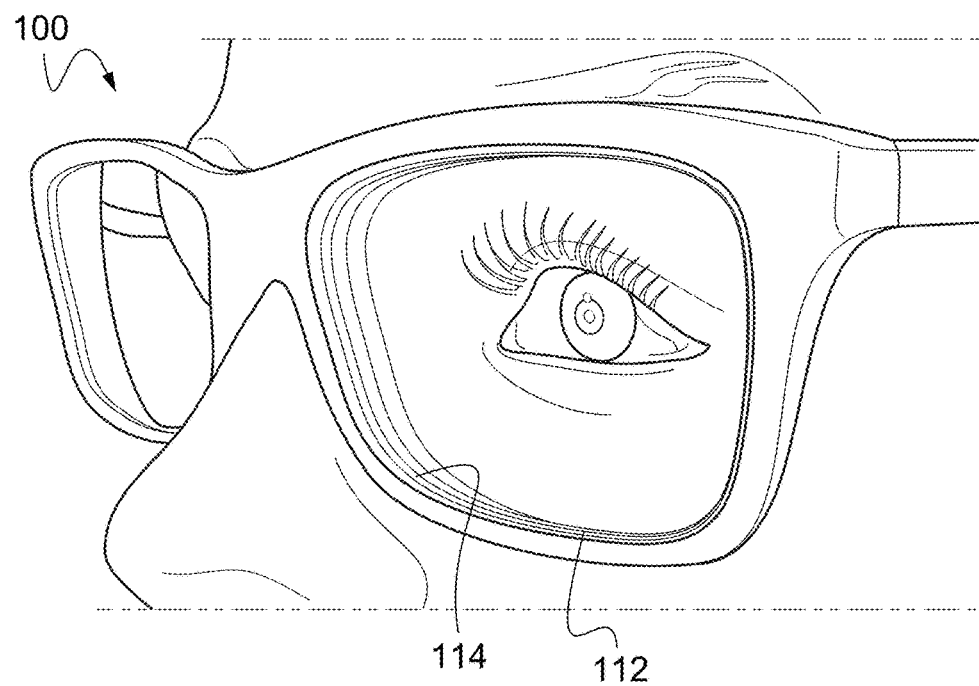
FIG. 1B is a photograph showing side view of a user wearing an eyeglass 100. A white ring 112 and a myopia ring 114 is shown.
Figure 2A:
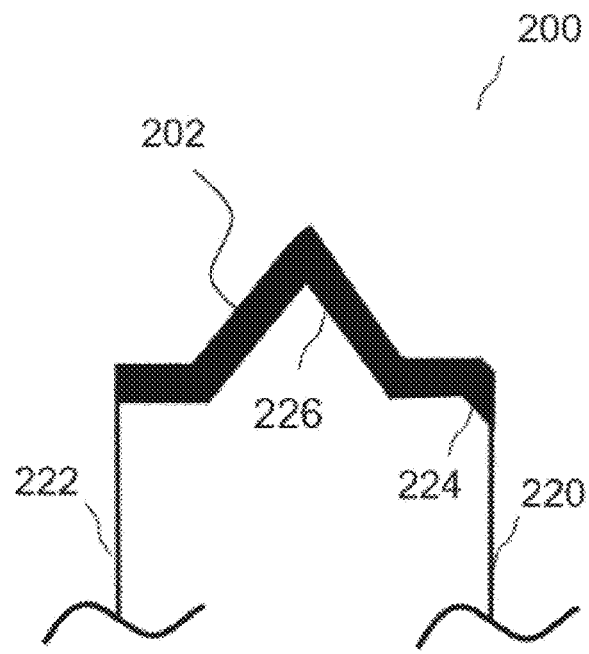
FIG. 2A is a schematic diagram showing an edge coating 202 disposed on an edge surface of an optical lens 200 according to an embodiment. The edge surface of the optical lens 200 is defined by the surface connecting the first optical surface 220 and the second optical surface 222. The first optical surface 220 and the second optical surface 222 may respectively be a concave (Cc) surface and a convex (Cx) surface of the optical lens 200. The edge surface of the optical lens 200 comprises a lens bevel 226 and a safety bevel 224. As depicted in the figure, there is no overflow on the first optical surface 220 and the second optical surface 222 of the optical lens 200.
Figure 2B:
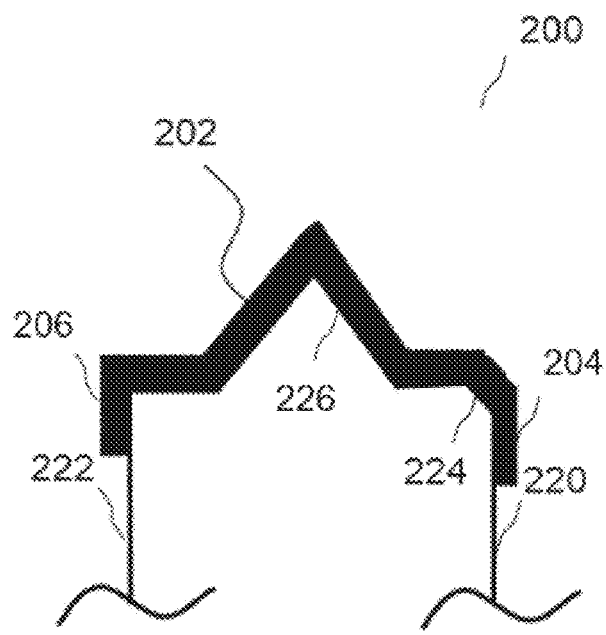
FIG. 2B is a schematic diagram showing an edge coating 202 disposed on an edge surface of an optical lens 200 according to an embodiment. The edge surface of the optical lens 200 is defined by the surface connecting the first optical surface 220 and the second optical surface 222. The first optical surface 220 and the second optical surface 222 may respectively be a concave (Cc) surface and a convex (Cx) surface of the optical lens 200. The edge surface of the optical lens 200 comprises a lens bevel 226 and a safety bevel 224. As depicted in the figure, there is overflow in the form of excess coating material 204, 206 disposed respectively on the first optical surface 220 and the second optical surface 222 of the optical lens 200.
Figure 3:
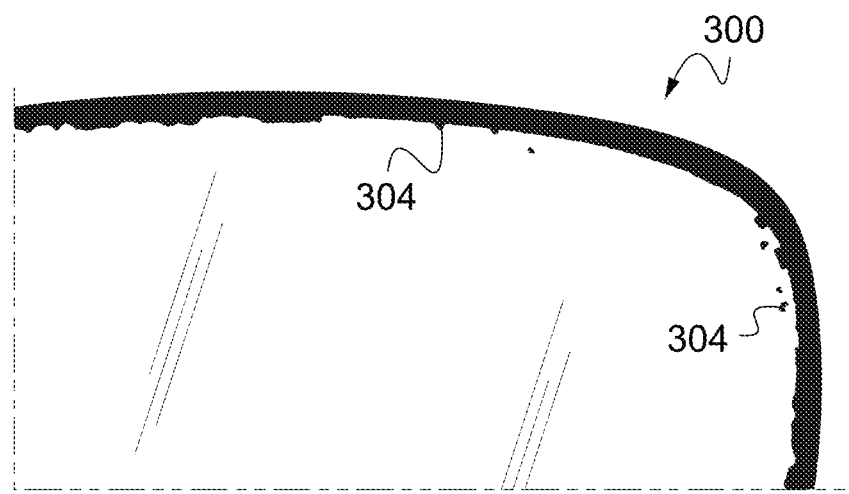
FIG. 3 is a photograph showing an optical lens 300 after edge coating, and a removal process to remove overflow from the optical surfaces. As depicted in the figure, remnants of coating 304 not removed by the removal process remain as fragments on the optical lens 300.

Various embodiments disclosed herein describe an easy and efficient process to deposit one or more coating materials on an edge surface of an optical lens, as well as characteristics of one or more temporary protective materials disposed on an optical surface of the optical lens to allow convenient removal of any overflow of the one or more coating materials from the optical surface.

For example, at least one temporary protective material may be disposed on at least a portion of a perimeter portion of an optical surface of an optical lens prior to disposing of at least one coating material on an edge surface of the optical lens. By disposing the at least one temporary protective material on at least a portion of a perimeter portion of the optical surface, any excess coating material from the edge surface as a result of the edge coating process may be disposed directly on the at least one temporary protective material instead of directly on the optical surface.

The at least one temporary protective material may comprise or be formed of a material having a suitable surface energy, such that a bonding force between the any excess coating material and the at least one temporary protective material is smaller than a bonding force between the edge surface and the at least one edge coating. Accordingly, by applying a suitable force that is intermediate between the two bonding forces to the any excess coating material, the any excess coating material may be removed from the at least one temporary protective material with the at least one edge coating remaining intact on the edge surface.

In addition to or apart from the above, the at least one temporary protective material may be removed together with the any excess coating material. For example, the at least one temporary protective material may comprise or be formed of a material having a suitable surface energy, such that a bonding force between the at least one temporary protective material and the underlying optical surface is smaller than or equal to a bonding force between the at least one temporary protective material and the any excess coating material. Accordingly, by applying a suitable force that is greater than the bonding force between the at least one temporary protective material and the underlying optical surface, the at least one temporary protective material and the any excess coating material may be removed from the optical surface.

Advantageously, methods disclosed herein remove limitations present in state of the art methods regarding choice of coating material and/or substrates for forming optical lens. This may translate into improved mechanical performances of the lens edge coating. Furthermore, methods of coating an edge surface of an optical lens disclosed herein may be made simpler and less operator-dependent.

With the above in mind, various embodiments refer in a first aspect to a method of coating an edge surface of an optical lens.

As used herein, the term "optical lens" refers to any type of lens intended to be supported by a wearer's face, which may be for purposes of improving or enhancing visual acuity, for protecting against the environment, for fashion, or for adornment. The term may refer to ophthalmic lenses, such as non-corrective lenses, semi-finished lens blanks, and corrective lenses, such as progressive addition lenses, unifocal or multifocal lenses. The term may also include one or more of prescription, non-prescription, reflective, anti-reflective, magnifying, polarizing, filtering, anti-scratch, colored, tinted, clear, anti-fogging, ultraviolet (UV) light protected, or other lenses. Further examples of optical lens include electronic lens, virtual reality (VR) lens, and the like.

An optical lens is generally manufactured in accordance with wearer specifications from an optical lens blank such as a semi-finished lens blank. A semi-finished lens blank generally has two opposite surfaces at least one of which is unfinished. The unfinished surface of the lens blank may be machined according to the wearer's prescription to provide the required surface of the optical lens. An optical lens having finished back and front surfaces may be referred to as an uncut optical lens. In the case of an ophthalmic lens for the correction or improvement of eyesight, for example, the ophthalmic lens may be manufactured according to a wearer prescription corresponding to the visual requirements of that wearer. At least one of the surfaces of the ophthalmic lens may be processed to provide an ophthalmic lens according to the wearer prescription.

The shape and size of the spectacle frame supporting the optical lens may also be taken into account. For example, the contour of the uncut optical lens may be edged according to a shape of a spectacle frame on which the optical lens is to be mounted in order to obtain an edged or cut optical lens.

Various embodiments according to the method disclosed herein comprises providing an optical lens comprising a first optical surface and an opposing second optical surface, wherein the first optical surface and the second optical surface are connected by an edge surface.

As mentioned above, optical lens may be manufactured in accordance with wearer specifications and which may be processed to provide the optical lens with various functions. Accordingly, optical lens may have a complex structure resulting from interlayering of materials and/or a series of treatments to tailor the optical lens to specific user requirements. For example, the treatments may be carried out to reduce thickness and to render the optical lens lightweight, to improve on transparency, for durability, strength and protection, aesthetics etc. It follows that an optical lens may comprise one or more coatings disposed on a surface of a substrate functioning as an optical surface, such as an anti-breakage coating, an anti-scratch coating, an anti-reflection coating, a tint coating, a color coating, an anti-static coating, or an anti-smudge coating.

Accordingly, the term "optical surface" as used herein refers to surface of a substrate in the form of a bare optical lens without any coating disposed on the optical surface(s), such as an unfinished or untreated optical lens, as well as surface of a coating which may be designed to be temporarily or permanently disposed on the optical surface(s) of a bare optical lens. Examples of a coating that may be disposed on an optical lens have already been mentioned above, and may further include, but are not limited to, (1) topcoat, (2) anti-reflective (AR) coatings and asymmetrical mirrors, (3) hardcoat (HC). In various embodiments, the first optical surface and the second optical surface may independently be a substrate, a substrate having a hard coat, or a substrate having a hard multi-coat (HMC) coating, i.e. an anti-reflective (AR) coating, a hardcoat (HC), and a topcoat disposed thereon. In various embodiments, the first optical surface and the second optical surface may respectively be a concave (Cc) surface and a convex (Cx) surface of the optical lens.

The first optical surface and the second optical surface are connected by an edge surface. As used herein, the term "edge surface" refers to a lateral flank and/or external contour of an optical lens. For example, the edge surface may define a surface on the lateral flank and/or external contour of an optical lens upon which a coating material is to be disposed. The edge surface may include a lens bevel and a safety bevel. The term "lens bevel" refers generally to the edge of a lens shaped like a "V", and may help to secure the lens after it has been inserted in an eyewear frame. The term "safety bevel", on the other hand, refers to a flattening bevel ground on the external contour of the optical lens, which may be formed at an interface between the external contour and the optical faces of the optical lens, whereby the sharp edges have been removed for a safer lens. The lens bevel and the safety bevel may constitute a profile on the edge surface.

Figure 6A:
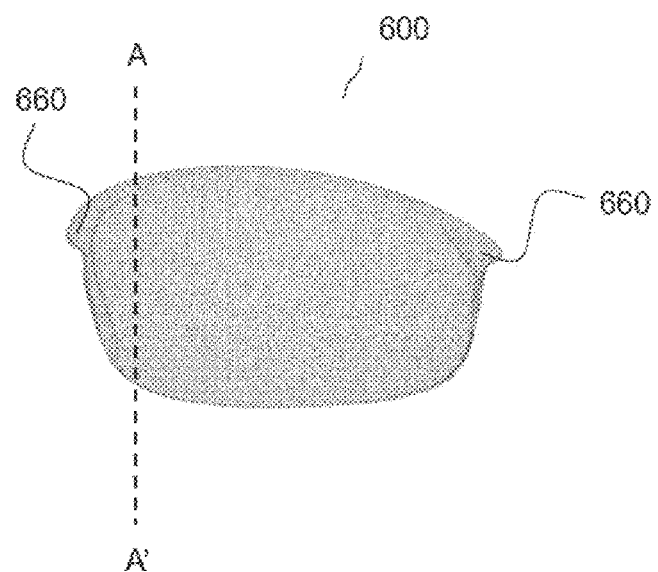
FIG. 6A is a photograph showing an optical lens 600. As depicted in the figure, the profile of the edge surface includes a step-back 660 along a perimeter portion of one or both of the first optical surface and the second optical surface.
Figure 6B:
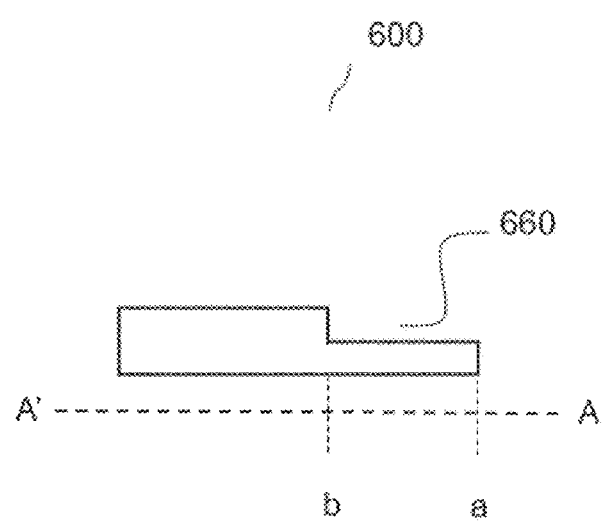
FIG. 6B is a schematic diagram showing a cross-section of the optical lens 600 of FIG. 6A along line A-A'. The step-back 660 is shown as a "L" shape with reference to the edge surface and the optical surface of the optical lens 600.

In some embodiments, the optical lens may further include a step-back on a perimeter portion of one or both of the first optical surface and the second optical surface abutting the edge surface. In such embodiments, the profile on the edge surface may include the step-back along with the lens bevel and the safety bevel. An example of a step-back is shown in FIG. 6A and FIG. 6B. As shown in the figures, the optical lens 600 includes a step-back 660 on an optical surface abutting the edge surface, which may be formed by removing a portion of a perimeter portion of the optical surface. Although the step-back 660 in FIG. 6B is shown as a "L" shape with reference to the edge surface and the optical surface of the optical lens 600, it may be of any other shapes such as a "C" shape, a staggered "L" shape, or an irregular shape, for example, with reference to the edge surface and the optical surface of the optical lens 600. The step-back portion may be used to retain the at least one coating material with object of providing a desired colored contour on the optical lens. For example, the step-back portion with the at least one coating material could provide a desired colored contour which looks like the rim of eyeglasses frame.

The method may include disposing at least one temporary protective material on at least a portion of a perimeter portion of one or both of the first optical surface and the second optical surface abutting the edge surface.

As used herein, the term "temporary protective material" refers to a substance or compound which is applied to an optical lens for masking or shielding purposes. At least one temporary protective material may be disposed on the optical surfaces, meaning that one, two, three, or a plurality of the temporary protective material may be present. The at least one temporary protective material may be disposed as one or more layers on optical surfaces before the lens edge coating process. In some embodiments, two or more layers of the temporary protective material are present, and each of the one or more layers may comprise the same or a different temporary protective material. The at least one temporary protective material may, for example, serve as a mask for the first and second optical surfaces, providing a barrier from the overflows and allow the overflows to be easily removed. The at least one temporary protective material may eventually be removed to reveal the underlying finished optical surfaces. In other words, the at least one temporary protective material may not be present in a finished optical lens. Accordingly, the at least one temporary protective material may be a material that does not form strong bonds with the optical lens, thereby rendering it possible for the at least one temporary protective material to be removed with relative ease from the optical lens. The at least one temporary protective material may also comprise or be formed of a material which presents minimal impact on the properties of the optical surface(s) after its removal.

In various embodiments, the at least one temporary protective material is selected from the group consisting of a metallic fluoride, a metallic oxide, natural polymers, block copolymer, and a combination thereof.

Examples of metallic fluorides include, but are not limited to, magnesium fluoride ($MgF_2$), lanthanum fluoride ($LaF_3$), aluminum fluoride ($AlF_3$), cerium fluoride ($CeF_3$), or a combination thereof.

Examples of metallic oxides include, but are not limited to, titania ($TiO_2$), alumina ($Al_2O_3$), zirconia ($ZrO_2$), praseodymium oxide ($Pr_2O_3$), or a combination thereof.

Examples of natural polymers include, but are not limited to, cellulose derivatives such as methyl cellulose, carboxymethyl cellulose, hydroxyethyl cellulose and ethylhydroxy cellulose; natural rubbers such as gum arabic and tragacanth gum; proteins such as glue, gelatin, casein and albumin; glucosides such as saponin; and alginic acid, and alginic acid derivatives such as propyleneglycol alginate, triethanolamine alginate, and ammonium alginate, or a combination thereof.

Examples of block copolymers include, but are not limited to, poly(styrene-Acrylate), polystyrene-polyether, polystyrene-polycaprolactone, polyacrylate-polycaprolactone, polyether-polyacrylate, polyvinyl-polyacrylate, polyvinyl-polycaprolactone, polyvinyl-polystyrene, a copolymer thereof, or a combination thereof.

In various embodiments, the at least one temporary protective material comprises one or more metallic fluorides selected from the group consisting of magnesium fluoride ($MgF_2$), lanthanum fluoride ($LaF_3$), aluminum fluoride ($AlF_3$), and cerium fluoride ($CeF_3$), or one or more metallic oxides selected from the group consisting of titania ($TiO_2$), alumina ($Al_2O_3$), zirconia ($ZrO_2$), or praseodymium oxide ($Pr_2O_3$).

In some embodiments, the at least one temporary protective material comprises a mixture of MgO and $MgF_2$ (mixture otherwise termed herein as Mixture X).

In some embodiments, the at least one temporary protective material is a peelable coating, meaning that it may be a layer that may be manually removed from the optical surface(s) by an operator without use of tools. Examples of material which may be used to form the peelable coating may include a polyvinyl acetal such as polyvinyl butyral (PVB) and polyvinyl formal (PVF), and which may be provided in a sol-gel/UV formulation.

The at least one temporary protective material is disposed on at least a portion of a perimeter portion of one or both of the first optical surface and the second optical surface abutting the edge surface.

As used herein, the term "perimeter portion" refers to an area on an optical surface which is offset from and proximate to an edge of the optical surface. For example, the perimeter portion may be offset from an edge of the optical surface, such that it covers 50% or less of the entire surface area of the optical surface, such as 40% or less, 30% or less, 20% or less, 10% or less of the entire surface area of the optical surface. As mentioned above, the edge surface of the optical lens may define a surface on the lateral flank and/or external contour of an optical lens upon which a coating material is to be disposed. Accordingly, the edge of the optical surface defining the perimeter portion upon which the at least one temporary protective material is disposed, may be defined from an edge of the optical surface abutting the coating material. This means that in embodiments wherein a step-back is present such as that shown in FIG. 6B, for example, the edge of the optical surface may be defined from b instead of from a, since a coating material may be disposed on the step-back as well.

In some embodiments, the at least one temporary protective material is disposed at an entire perimeter portion of one or both of the first optical surface and the second optical surface abutting the edge surface. Advantageously, this allows an edge surface of the optical lens to be coated around its entire perimeter. The perimeter portion may be offset equally from an edge of the optical surface. In some embodiments, the perimeter portion may be offset by a differing distance from an edge of the optical surface along the perimeter.

In various embodiments, the at least one temporary protective material is disposed on only at least a portion of a perimeter portion of one or both of the first optical surface and the second optical surface abutting the edge surface. This means that the at least one temporary protective material is disposed only at a portion, or an entire perimeter portion, of one or both of the first optical surface and the second optical surface abutting the edge surface, and does not cover portions nearer the central area of the optical surface(s).

In alternative embodiments, disposing the at least one temporary protective material is carried out on an area covering all of the first optical surface and the second optical surface. This may be the case, for example, in embodiments wherein the at least one temporary protective material also functions to prevent damage to the optical surfaces while the optical lens is secured with a holding device applied to the optical surfaces, for trimming of the edge surface of the optical lens.

Disposing the at least one temporary protective material may generally be carried out using any suitable deposition or coating method, such as a conformal deposition method. For example, disposing the temporary protective material may be carried out by a method selected from the group consisting of vacuum deposition, vapor deposition, sol-gel deposition, spin coating, dip coating, spray coating, flow coating, film laminating, sticker coating, roller coating, brush coating, painting, sputtering, casting, Langmuir-Blodgett deposition, laser printing, inkjet printing, screen printing, pad printing, and a combination thereof.

Subsequently, at least one coating material may be disposed on the edge surface of the optical lens to obtain at least one edge coating. As mentioned above, the edge surface of the optical lens may be multi-faceted or comprise various shape profiles depending on specific requirements for the finished optical lens. The edge surface of an optical lens may, for example, comprise a lens bevel, a safety bevel, and/or a step-back. The at least one coating material may accordingly be disposed on an entire portion of the edge surface, or on selected portions of the edge surface, such as on one or more facets of a multi-faceted edge surface, the lens bevel, the safety bevel, and/or the step-back.

As mentioned above, at least one coating material may be introduced on the edge of an optical lens as one or more edge coatings for various reasons. For example, one, two, three, or a plurality of the coating material may be disposed on the edge of an optical lens. The coating material may, for example, be at least one of (a) a material effective to reduce a reflection caused by a profile of the edge surface, (b) a lubricating material effective to ease mounting of the optical lens onto an eyeglass frame, (c) a shock absorbing material effective to reduce stress concentrations on an edge portion of the optical lens, or (d) a material effective to provide an aesthetic effect to the edge surface. The at least one coating material may be disposed as one or more layers on the edge of an optical lens. In some embodiments, two or more layers of the coating material are present, and each of the one or more layers may comprise the same or a different coating material.

In various embodiments, the at least one coating material is a material effective to reduce a reflection caused by a profile of the edge surface. The at least one coating material may, for example, be a material effective to provide an aesthetic effect to the edge surface.

As mentioned above, an opaque coating may be deposited on the edge of an optical lens to reduce or to prevent "myopia rings" and "white rings" for aesthetic purposes. By reducing a reflection caused by a profile of the edge surface, appearance of the "myopia ring" or "white ring" otherwise appearing along the perimeter of the optical lens face may be reduced.

The opaque coating may have a color that can be user specified. For example, the color of the opaque coating may be chosen to be the same as or to complement with color of an eyewear frame with which the optical lens is fitted. The color of the opaque coating may alternatively be chosen to contrast with the color of the eyewear frame, thereby giving the wearer an additional fashion choice while providing the benefits of reducing the appearance of the "myopia ring" or "white ring" appearing along the perimeter of the optical lens face.

Besides the above-mentioned, a translucent colored coating may be applied to the edge of the optical lens to allow some light to pass through, thereby camouflaging or disguising the "myopia ring" or "white ring".

Examples of materials effective to reduce a reflection caused by a profile of the edge surface include, but are not limited to, a UV-curable composition such as acrylate, epoxy, unsaturated polymer, silane, styrene, vinyl chloride, vinyl acetate, a thermal-curable composition such as polyurethane, polyurea, epoxy, polyester, polyamide, polyimide, polyether, and a combination thereof.

It is mentioned herein that in embodiments wherein the at least one coating material comprises a UV-curable and/or thermal-curable composition, the at least one temporary protective material may comprise or consist of a material which is compatible with UV-curing and/or thermal curing of the at least one coating material.

In addition to or apart from the above, the at least one coating material may be a lubricating material effective to ease mounting of the optical lens onto an eyeglass frame. For example, the material may be a polymer having a lubricating fluid, such as synthetic oil or a lubricity enhancing polyfluoropolyether fluid, or a lubricating grease applied thereto.

In addition to or apart from the above, the at least one coating material may be a shock absorbing material effective to reduce stress concentrations on an edge portion of the optical lens. In some embodiments, the shock absorbing material is effective to totally reduce or to prevent stress concentrations on an edge portion of the optical lens. Examples of such material include, but are not limited to, carbon black, iron oxide, metallic oxide, and a combination thereof.

The at least one coating material may be disposed on the edge surface using a method as that described above for disposing the at least one temporary protective material. The same or a different method may be used to dispose each of the at least one coating material and the at least one temporary protective material. In various embodiments, either one or both of disposing the at least one temporary protective material and disposing the at least one coating material are carried out by a method selected from the group consisting of vacuum deposition, vapor deposition, sol-gel deposition, spin coating, dip coating, spray coating, flow coating, film laminating, sticker coating, roller coating, brush coating, painting, sputtering, casting, Langmuir-Blodgett deposition, laser printing, inkjet printing, screen printing, pad printing, and a combination thereof.

In various embodiments, the method disclosed herein further comprises trimming the edge surface of the optical lens according to specific requirements after the at least one temporary protective material is disposed, and before disposing the at least one coating material. Advantageously, trimming the edge surface of the optical lens after the at least one temporary protective material is disposed allows any temporary protective material deposited on the edge surface to be removed before the at least one coating material is disposed on the edge surface. Ideally, the at least one temporary protective material is not present on the edge surface area of the optical lens after edging.

The trimming may comprise machining the edge surface and/or the optical surface(s) of the optical lens so as to conform it to required dimensions for adapting the optical lens to the eyewear frame into which it is intended to be accommodated. In some embodiments, trimming the edge surface and/or one or both of the first optical surface and the second optical surface of the optical lens comprises grinding of a profile of the edge surface, in a process otherwise termed as "edging". For example, a lens bevel and/or a safety bevel may be formed on the edge surface of the optical lens during trimming. In addition or alternatively, one or both of the first optical surface and the second optical surface of the optical lens may be trimmed to form a step-back. In such cases, the profile of the edge surface may be defined by the step-back, as well as the lens bevel and/or the safety bevel, if present.

Generally, the trimming may be carried out on a grinding machine comprising one or more abrasive wheels. The optical lens may be secured by a holding device such as axially-acting clamps. During trimming, the optical lens may be moved relative to the one or more abrasive wheels, whereby such movement is controlled, generally digitally, so as to get the required shape.

Accordingly, the at least one temporary protective material may comprise or be formed of a material having sufficient mechanical properties that allows the optical lens to be subjected to the harsh mechanical process. In addition to or besides the above, the at least one temporary protective material may also provide sufficient friction or grip for the clamping elements, such that slippage after edging, if any, is less than 5° such as less than 2° from the reference axis.

The method disclosed herein includes removing any excess coating material disposed on the at least one temporary protective material from the one or both of the first optical surface and the second optical surface.

As mentioned above, some excess coating material may inadvertently be disposed on the optical surfaces, and which may need to be removed. While removing the excess coating material, it is important that the removal does not remove any coating material on the edge surface of the optical lens including the safety bevel and/or the step-back, since this may increase visibility of the "myopia ring" and/or "white ring".

Removing the any excess coating material may be carried out by one or all of (a) peeling off the any excess coating material, (b) applying an adhesive tape to the any excess coating material, and removing the adhesive tape, and (c) wipe off the any excess coating material.

In some embodiments, the at least one temporary protective material is removed together with the any excess coating material. This may be the case, for example, when a bonding force between the at least one temporary protective material and the underlying optical surface is smaller than or equal to a bonding force between the at least one temporary protective material and the any excess coating material.

Accordingly, by applying a force that is greater than the bonding force between the at least one temporary protective material and the underlying optical surface, both the at least one temporary protective material and the any excess coating material may be removed from the optical surface(s). As such, separation of the at least one temporary protective material and the any excess coating material from the underlying optical surface may be carried out.

For example, when an adhesive tape is used to remove the any excess coating material, the bonding force between the adhesive tape and the excess coating material as well as the at least one temporary protective material may be greater or much greater than the bonding force between the at least one temporary protective material and the underlying optical surface, such that the any excess coating material and the at least one temporary protective material may be removed from the optical surface.

In some embodiments, only the any excess coating material is removed from the at least one temporary protective material. This may be the case, for example, when a bonding force between the any excess coating material and the at least one temporary protective material is smaller than a bonding force between the edge surface and the at least one edge coating. Accordingly, by applying a force that is greater than the bonding force between the any excess coating material and the at least one temporary protective material, and which may additionally be smaller than the bonding force between the edge surface and the at least one edge coating to the any excess coating material, the any excess coating material may be removed from the at least one temporary protective material, while the at least one edge coating is retained on the edge surface.

In addition to or apart from the use of adhesive tapes, the any excess coating material may be wiped off or peeled off from the at least one temporary protective material.

Methods disclosed herein may be used on and for lenses that require coating on the edges, especially to remove any overflow hence not compromising the optical properties of lenses. For example, visibility of "myopia rings" and "white rings" may be reduced by the introduction of an opaque coating or a translucent coating on the edge of the lens.

Other applications may include use of a coating which has lubricating properties to ease the mounting of lenses onto spectacle frames, or use of a shock absorbing coating to reduce or prevent stress concentrations on lens edges to reduce crack formation on the lens. Examples of suitable coating materials have already been discussed above.

Various embodiments refer in a second aspect to an optical lens comprising a first optical surface and an opposing second optical surface, wherein the first optical surface and the second optical surface are connected by an edge surface, the optical lens further comprising at least one temporary protective material disposed on only at least a portion of a perimeter portion of one or both of the first optical surface and the second optical surface abutting the edge surface. Suitable temporary protective materials and methods to dispose the temporary protective materials have already been discussed above.

As mentioned above, the at least one temporary protective material may be disposed on only at least a portion of a perimeter portion of one or both of the first optical surface and the second optical surface abutting the edge surface. This means that the at least one temporary protective material is disposed only at a portion of one or both of the first optical surface and the second optical surface abutting the edge surface, and does not cover portions nearer the central area of the optical surface(s).

In various embodiments, the at least one temporary protective material is disposed on only an entire perimeter portion of both the first optical surface and the second optical surface. In other words, the at least one temporary protective material is not disposed on portions nearer the central area of the optical surface(s), meaning that the at least one temporary protective material does not cover an entire area of the first optical surface and the second optical surface. For example, the perimeter portion may be offset from an edge of the optical surface, such that it covers 50% or less of the entire surface area of the optical surface, such as 40% or less, 30% or less, 20% or less, 10% or less of the entire surface area of the optical surface.

Advantageously, such an optical lens may be provided to a user or an eyecare practitioner, so that they may form an edge coating on the optical lens with a coating material of their choice and/or for reasons as set forth above, thereby allowing customization. Any excess coating material may be disposed directly on the at least one temporary protective material, hence easily and simply removed by the user and/or eyecare practitioner. Since the at least one temporary protective material is disposed on only at least a portion of a perimeter portion of the optical surface(s), and does not cover an entire area of the first optical surface and the second optical surface, this may further ease its removal.

In various embodiments, the optical lens further comprises at least one coating material disposed on the edge surface of the optical lens, wherein the at least one coating material is at least one of (a) a material effective to reduce a reflection caused by a profile of the edge surface, (b) a lubricating material effective to ease mounting of the optical lens onto an eyeglass frame, (c) a shock absorbing material effective to reduce stress concentrations on an edge portion of the optical lens, or (d) a material effective to provide an aesthetic effect to the edge surface. Suitable coating materials have already been discussed above.

EXPERIMENTAL SECTION

Figure 4:
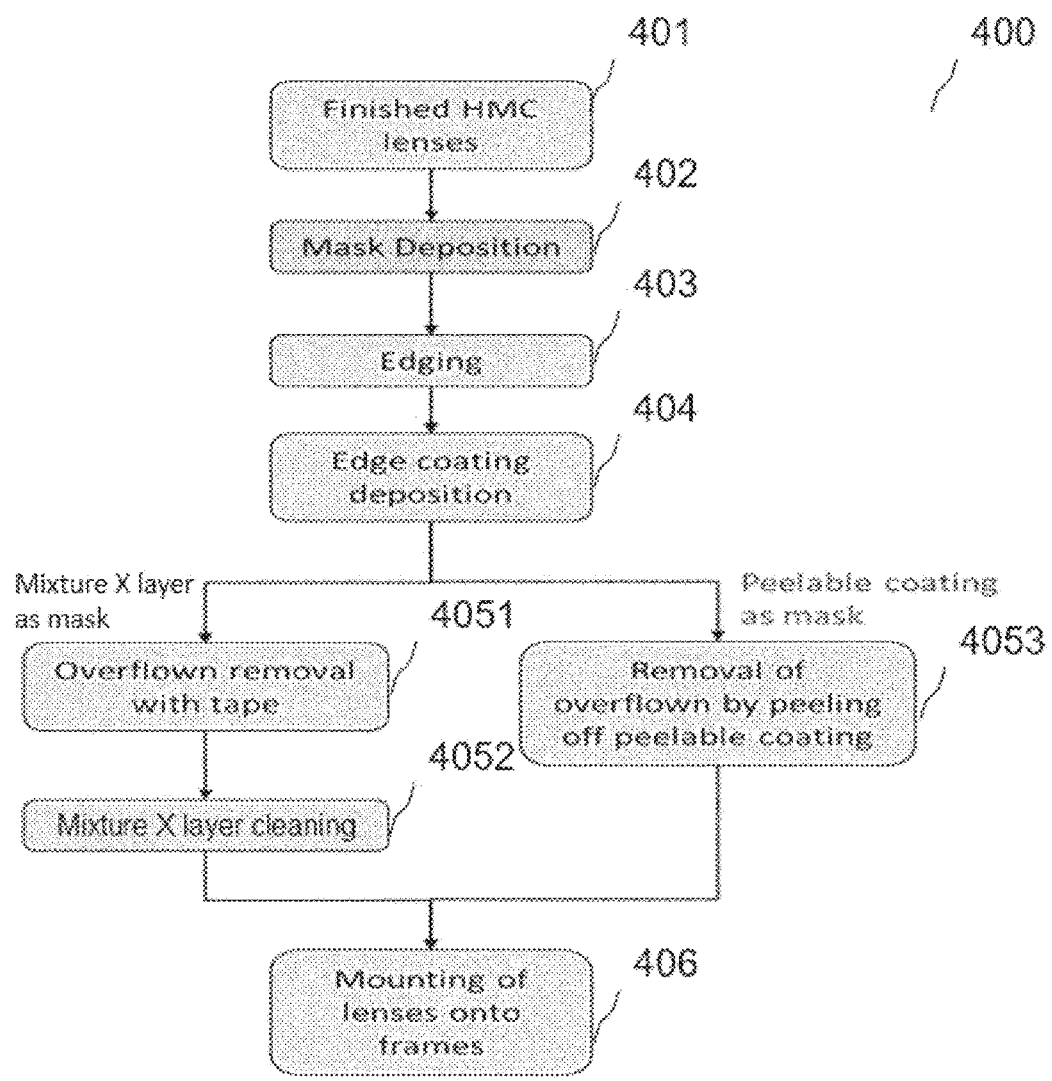
FIG. 4 is a flow diagram depicting a process flow to produce a finished lens with coating on its edge according to an embodiment.

For illustration purposes only, FIG. 4 is a flow diagram describing a process (400) to prepare a finished lens with coating on its edge according to an embodiment.

As shown in the figure, an optical lens such as a HMC lens (HMC means a coated lens comprising an anti-reflective (AR) coating, a hardcoat (HC), and a topcoat) is provided (401). A temporary protective material may be deposited on the lens as a mask (402). The temporary layer may, for example, be an inorganic film deposited via a physical vapor deposition (PVD) process (e.g. MgO and $MgF_2$ in the case of Mixture X layer), a sol-gel/UV formulation deposited by spin/dip coating (peelable coating), a film laminate, stickers or others, as discussed above.

An edging step (403) may be included after mask deposition (402). In a particular mode, the edging step (403) may include trimming of a step-back or safety bevel. The edging step (403) may be carried out by machine grinding, which has the effect of removing lens material including temporary protective material on concave side (and/or also eventually on convex side) of the optical lens. As mentioned above, the temporary protective material may provide a good grip to prevent slippage during edging. At the end of the edging process, the temporary protective material may be disposed on at least a portion of a perimeter portion of one or both optical surfaces, while being completely absent on the lens edge.

Subsequently, a coating material may be applied to the edge surface of the optical lens in an edge coating deposition step (404). The edge coating deposition step (404) may further comprise a curing step to cure the coating material. Essentially, at least a portion of or all the facets on the lens edge may be covered. Any excess coating material or overflow may be disposed on the temporary protective material.

The any excess coating material may be removed in a removal step (4051, or 4053). Step 4052 to remove the temporary layer of Material X may optionally be carried out in case the temporary layer should also be removed. In embodiments wherein the edge coating deposition step (404) includes a curing step, removal of any excess coating material may be initiated as soon as the coating material has cured.

In embodiments wherein the temporary protective material comprises Mixture X, removal of the any excess coating material may be carried out in two steps (4051, 4052). An adhesive tape may firstly be used to remove most of the any excess coating material (4051). Regular cleaning with a suitable cloth may be used in a subsequent step (4052) to remove completely the Mixture X layer as well as the remaining any excess coating material.

In embodiments wherein the temporary protective material is a peelable coating, removal of the any excess coating material may be carried out in a single step by peeling off the temporary protective material (4053).

Subsequently, the optical lens may be mounted onto the frames (406).

TABLE 1 compares the ease and completeness of overflow removal using Mixture X as the temporary protective material as compared to overflow removal from surfaces without Mixture X.

From the results obtained, delamination of Mixture X layer during edging was not observed. This is advantageous as delamination of additional layer/mask would make removal of overflow difficult. Furthermore, overflow removal on lenses with Mixture X layer is easy and 100% overflow removal is possible when the Mixture X layer is wiped clean. In comparison, overflow removal on Lens with HC and AR coating and without Mixture X layer is difficult, although possible only after multiple adhesive tape application.

Numerous prototypes with different optical designs (myopic, hyperopic, PALs) and tints (sunwears) have been produced (results not shown).

TABLE 1

Performance of removal of overflow on different layer/mask
Removal of overflow—Tape used: DS blue tape

| HMC | Delamination of mask | Ease of removal | 100% removal |
| --- | --- | --- | --- |
| Lens with hard coating (HC) only | Y | N | N |
| Lens with HC and AR coating and with Mixture X | Y | Y | Y |
| Lens with HC and AR coating and without Mixture X | Y | N | Y |

(Legend: Y denotes Yes; N denotes No)

TABLE 2 shows the performance of different peelable coatings with respect to the overflow removal process.

TABLE 2

Removal of overflow on peelable coatings—Tape used: DS

| HMC | Delamination of mask | Ease of removal | 100% removal |
| --- | --- | --- | --- |
| Lens A | N | N | N |
| Lens B | Y | Y | Y |
| Lens C | N | N | N |

(Legend: Y denotes Yes; N denotes No)

Delamination of peelable coating mask were seen in both Lens A and Lens C. Coating delaminates in both wet and dry edging process. The only peelable coating which was able to withstand the edging process was Lens B, which has a lower curvature. As in the case for lenses with Mixture X layer, it has been demonstrated that there is ease of removal of overflow with the removal of the peelable coating after edge coating application.

Use of peelable coating has also been demonstrated on low-powered myopic lenses (results not shown), where "low-powered myopic lenses" is defined as lenses less than −4 diopter.

For comparison purposes, masking using blue tape or anti-slip films were used instead of a temporary protective material, and results are shown in TABLE 3. As can be seen, film/tape mask could not withstand the edging process. Issues includes delamination of mask during edging and shrinkage of mask were encountered during the edging process. Shrinkage of mask on the optical surfaces of lens caused exposure of optical surfaces to the excess coating material, which resulted in difficulty in removal of the excess coating material.

TABLE 3

Performance of film/tape mask

| Type of masks | Results# | Remarks |
| --- | --- | --- |
| Blue film before edging | Not good | Issues for cutting of blue films due to flexibility of film. Delamination and shrinkage of film observed after edging. Improvements seen using dry edging process |
| Anti-slip film | Not good | Delamination of film observed. |

Figure 5A:
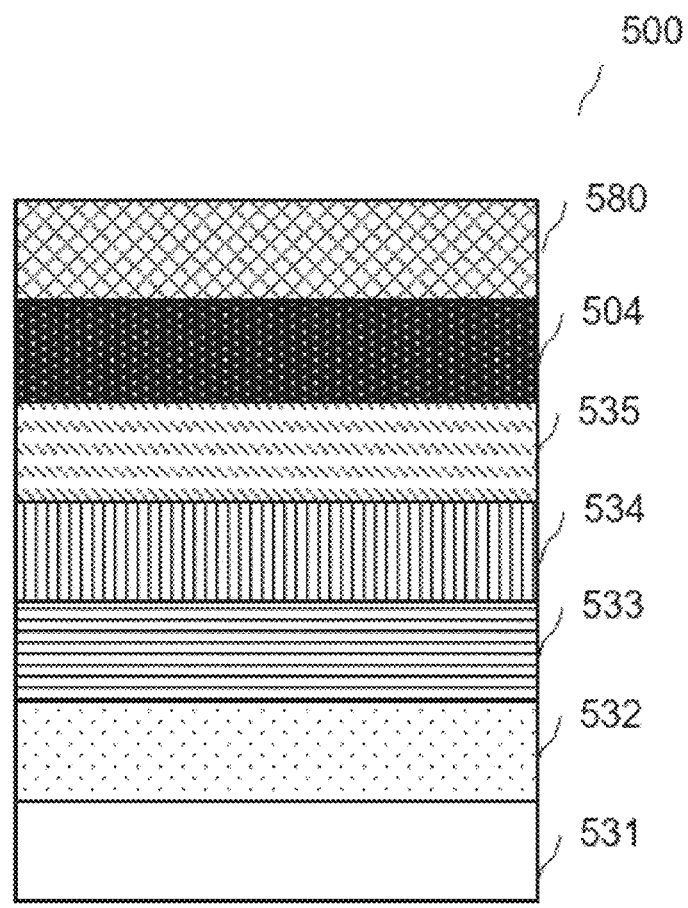
FIG. 5A is a schematic diagram showing cross-section of overflow on a lens during removal of coating according to embodiments.

FIG. 5A is a schematic diagram showing cross-section of overflow on an optical lens 500 during removal of coating according to embodiments.

As shown in the figure, the optical lens 500 includes a substrate 531. A HC layer 532, AR layer 533, and topcoat layer 534 are disposed on the substrate 531. Together, the substrate 531, HC layer 532, AR layer 533, and topcoat layer 534 make up a HMC lens.

According to methods disclosed herein, a temporary protective material is disposed as a temporary protective layer 535 on the topcoat 534. Subsequently, the edge surface of the optical lens is subjected to a coating process, and any excess coating material may be disposed on the temporary protective layer 535 as overflow layer 504. An adhesive tape 580 may be applied to the overflow layer 504, and the excess coating material may be attached to the adhesive tape 580. By removing the adhesive tape 580, the excess coating material in the overflow layer 504 may be removed. In some embodiments, the adhesive force between the adhesive tape 580 and the excess coating material in the overflow layer 504 is greater than the bonding force between the temporary protective layer 535 and the topcoat layer 534, such that the temporary protective layer 535 is removed along with the overflow layer 504.

Figure 5B:
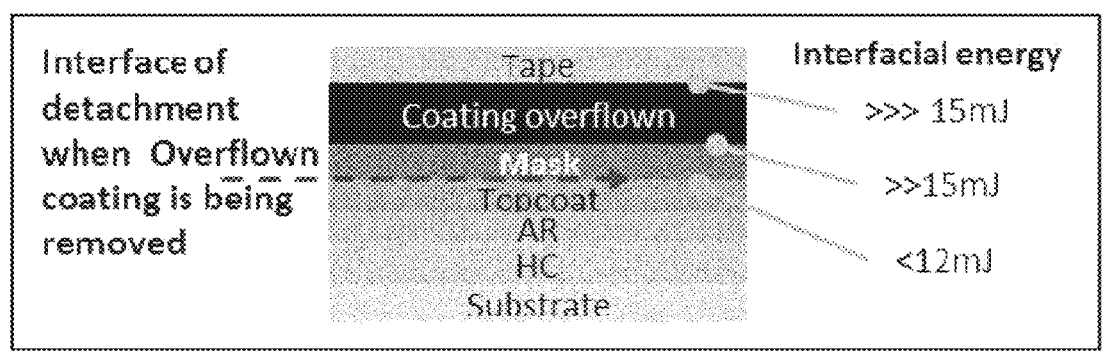
FIG. 5B is a schematic diagram showing cross-section of overflow on a lens during removal of coating according to an embodiment.

FIG. 5B is a schematic diagram showing cross-section of overflow on a lens during removal of coating according to an embodiment. In the embodiment shown, interfacial energies between the mask-topcoat interface ("<12 mJ", i.e. less than 12 mJ) is smaller than interfacial energy at the tape-coating-mask interface (">>15 mJ", i.e. much greater than 15 mJ). As such, the mask and the coating layer may be removed along with removal of the tape.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of coating an edge surface of an optical lens, the method comprising
    a) providing an optical lens comprising a first optical surface and an opposing second optical surface, wherein the first optical surface and the second optical surface are connected by an edge surface;
    b) disposing at least one temporary protective material on at least a portion of a perimeter portion of one or both of the first optical surface and the second optical surface abutting the edge surface, wherein the at least one temporary protective material is selected from the group consisting of a metallic fluoride, a metallic oxide, and a combination thereof;
    c) disposing at least one coating material on the edge surface of the optical lens to obtain at least one edge coating;
    d) removing any excess coating material disposed on the at least one temporary protective material from the one or both of the first optical surface and the second optical surface; and
    e) removing the at least one temporary protective material together with the any excess coating material or after the any excess coating material is removed.

2. The method according to claim 1, further comprising trimming the edge surface and/or one or both of the first optical surface and the second optical surface of the optical lens according to specific requirements after the at least one temporary protective material is disposed, and before disposing the at least one coating material.

3. The method according to claim 2, wherein trimming the edge surface and/or one or both of the first optical surface and the second optical surface of the optical lens comprises grinding of a profile of the edge surface.

4. The method according to claim 1, wherein disposing the at least one temporary protective material is carried out on only an entire perimeter portion of both the first optical surface and the second optical surface, and is not disposed on portions nearer the central area of the first optical surface and the second optical surface.

5. The method according to claim 1, wherein either one or both of disposing the at least one temporary protective material and disposing the at least one coating material are carried out by a method selected from the group consisting of vacuum deposition, vapor deposition, sol-gel deposition, spin coating, dip coating, spray coating, flow coating, film laminating, sticker coating, roller coating, brush coating, painting, sputtering, casting, Langmuir-Blodgett deposition, laser printing, inkjet printing, screen printing, pad printing, and a combination thereof.

6. The method according to claim 1, wherein a bonding force between the at least one temporary protective material and the underlying optical surface is smaller than or equal to a bonding force between the at least one temporary protective material and the any excess coating material.

7. The method according to claim 1, wherein a bonding force between the any excess coating material and the at least one temporary protective material is smaller than a bonding force between the edge surface and the at least one edge coating.

8. The method according to claim 1, wherein the at least one temporary protective material is a combination of a metallic fluoride and a metallic oxide.

9. The method according to claim 8, wherein the at least one temporary protective material is a mixture of MgO and $MgF_2$.

10. The method according to claim 1, wherein the at least one coating material is at least one of (a) a material effective to reduce a reflection caused by a profile of the edge surface, (b) a lubricating material effective to ease mounting of the optical lens onto an eyeglass frame, (c) a shock absorbing material effective to reduce stress concentrations on an edge portion of the optical lens, or (d) a material effective to provide an aesthetic effect to the edge surface.

11. The method according to claim 1, wherein removing the any excess coating material is carried out by one or all of (a) peeling off the any excess coating material, (b) applying an adhesive tape to the any excess coating material, and removing the adhesive tape, and (c) wiping off the any excess coating material.

12. An optical lens comprising a first optical surface and an opposing second optical surface, wherein the first optical surface and the second optical surface are connected by an edge surface, the optical lens further comprising at least one temporary protective material disposed on only at least a portion of a perimeter portion of one or both of the first optical surface and the second optical surface abutting the edge surface, wherein the at least one temporary protective material is selected from the group consisting of a metallic fluoride, a metallic oxide, and a combination thereof.

13. The optical lens according to claim 12, further comprising at least one coating material disposed on the edge surface of the optical lens, wherein the at least one coating material is at least one of (a) a material effective to reduce a reflection caused by a profile of the edge surface, (b) a lubricating material effective to ease mounting of the optical lens onto an eyeglass frame, (c) a shock absorbing material effective to reduce stress concentrations on an edge portion of the optical lens, or (d) a material effective to provide an aesthetic effect to the edge surface.

* * * * *